United States Patent [19]

Granzow

[11] 4,247,447

[45] Jan. 27, 1981

[54] FLAME RETARDANTS CONTAINING TWO OR MORE 2-CYANOETHYL GROUPS FOR POLYPHENYLENE ETHER RESINS

[75] Inventor: Albrecht H. Granzow, Somerset, N.J.

[73] Assignee: American Cyanamid Company, Stamford, Conn.

[21] Appl. No.: 68,249

[22] Filed: Aug. 20, 1979

Related U.S. Application Data

[63] Continuation-in-part of Ser. No. 951,202, Oct. 13, 1978, abandoned.

[51] Int. Cl.³ .............................................. C08L 71/04
[52] U.S. Cl. ..................... 260/45.7 P; 260/45.9 NP; 260/45.9 KA; 525/68; 525/132
[58] Field of Search ............... 260/45.7 P, 45.9 K, 260/45.9 KA, 45.9 NP; 525/132, 68

[56] References Cited

U.S. PATENT DOCUMENTS

| | | | |
|---|---|---|---|
| 3,341,625 | 9/1967 | Gillham et al. | 260/45.7 PS |
| 3,981,841 | 9/1976 | Abolins et al. | 260/45.9 NP |
| 4,024,093 | 5/1977 | Abolins et al. | 260/45.7 P |

Primary Examiner—J. Ziegler
Attorney, Agent, or Firm—Bruce F. Jacobs

[57] ABSTRACT

Flame retardant compositions are prepared from rubber modified polyphenylene ether resins and phosphine oxide compounds containing at least two 2-cyanoethyl groups.

10 Claims, No Drawings

FLAME RETARDANTS CONTAINING TWO OR MORE 2-CYANOETHYL GROUPS FOR POLYPHENYLENE ETHER RESINS

CROSS REFERENCE TO RELATED APPLICATIONS

This application is a continuation-in-part of U.S. Ser. No. 951,202, filed Oct. 13, 1978, now abandoned.

The present invention relates to flame retardant polyphenylene ether resin compositions containing an effective flame retarding amount of a phosphine oxide containing at least two 2-cyanoethyl (—CH$_2$CH$_2$CN) groups. More particularly, it relates to flame retarded thermoplastic resin compositions containing a compound represented by the formula:

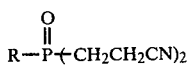

wherein R represents alkyl of about 1-12 carbon atoms; hydroxyalkyl wherein the alkyl portion contains about 1-8 carbon atoms; benzyl; alkylbenzyl, wherein the benzyl ring contains at least two alkyl groups containing about 1-4 carbon atoms; and ω-cyanoalkyl wherein the alkyl portion contains about 1 to 4 carbon atoms. Particularly preferred compounds of the above class are (1) tris(2-cyano-ethyl)phosphine oxide, (2) benzyl bis(2-cyanoethyl)-phosphine oxide and (3) 2,4,6-Trimethylbenzyl bis(2-cyano-ethyl)phosphine oxide:

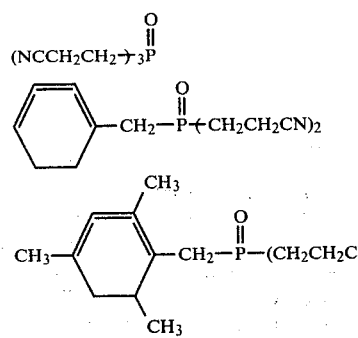

Tris(2-cyanoethyl)phosphine oxide is a known compound and is described by Rauhut et al, J. Am. Chem. Soc., Vol. 81, Page 1106 (1959). It has been used as a flame retardant for thermoplastic vinyl polymers, including polypropylene, as described in U.S. Pat. No. 3,341,625. The benzyl bis(2-cyanoethyl)phosphine oxide and the 2,4,6-trimethylbenzyl bis(2-cyanoethyl)-phosphine oxide may be prepared by reacting benzyl chloride or 2,4,6-trimethylbenzyl chloride respectively, with bis(2-cyanoethyl)phosphine oxide. Compounds wherein R is alkyl or hydroxyalkyl are similarly prepared.

Flame retardant rubber-modified polyphenylene ether resin compositions are made by incorporating an effective flame retarding amount of a compound of the above formula therein.

The polyphenylene ether resin compositions suitable for use in the present invention are described in U.S. Pat. No. 4,024,093, incorporated herein by reference. Basically, these resin compositions comprise about 10 to 90 parts by weight of polyphenylene ether and about 90 to 10 parts by weight of a styrene polymer. Preferably, the polymer contains about 50 to 80 parts by weight of polyphenylene ether resin and about 20 to 50 parts by weight of styrene polymer. The styrene polymer being a rubber-modified, high-impact polystyrene. The resins are blends of the two polymers, which are mutually soluble and form a homogeneous polymer composition.

The flame retardant compounds are used in an amount sufficient to provide a self-extinguishing composition, as defined below. In general, however, the amount is at least about 4% by weight based on the weight of resin composition, preferably at least about 6%, and most preferably, about 8 to 10%.

It is also within the scope of the invention to incorporate such additional ingredients as plasticizers, dyes, pigments, heat and light stabilizers, antioxidants, antistatic agents, photochronic materials, and the like.

EXAMPLE 1

The preparation of benzyl bis(2-cyanoethyl)phosphine oxide was conducted as follows:

To 500 ml. of dimethylformamide was added 78 g. (0.5 mol) of bis(cyanoethyl)phosphine oxide. A solution of 33 g. (0.5 mol) of potassium hydroxide in 200 ml. of methanol was then added. To this solution was added, dropwise, 63 g. (0.5 mol) of benzyl chloride. The mixture was heated at reflux for 2 hours, then the methanol was distilled off. Refluxing was continued for 30 minutes and cooled. The potassium chloride was filtered and the dimethylformamide removed by evaporation using a rotary evaporator. The residue was extracted 3 times with 300 ml. of boiling toluene. The combined toluene extracts were cooled, yielding 50 g of white crystalline solid, m.p. 118°–120° C.

EXAMPLE 2

Following the procedure of Example 1 except for the use of 2,4,6-trimethylbenzyl chloride instead of benzyl chloride the corresponding compound was prepared.

EXAMPLE 3

Preparation of 1,1-Dimethylhydroxymethylbis(2-cyanoethyl)-phosphine oxide (J. Org. Chem. 25, 4628–4632 (1961)

To a mixture of 0.1 mol of bis(2-cyanoethyl)phosphine oxide and 0.1 mol of acetone was added 1.0 gram of either triethyl amine or pentamethyl guanidine. The mixture was heated for 2 hours at steam bath temperatures. The resulting solid was filtered and recrystallized from acetone to give an 88% yield of product, m.p. 124°–125° C.

EXAMPLE 4

To a blend of 50 parts polyphenylene ether/50 parts rubber-modified impact polystyrene was added sufficient tris(2-cyanoethyl)phosphine oxide (TCEPO) to make 10 gram samples as per Table I. It was dry blended and extruded through a Melt Index Apparatus (described in ASTM D-1238) at 290°–300° C. The cylindrical extrudate, 3-5 inches long and 0.25 inch in diameter, was subjected to the following flammability test, described in Underwriters Laboratories Test UL-94, Vertical Test Method 3.10-3.15 (Sept., 1973). The polymer specimen, clamped in a vertical position, is ignited with a ¾" blue flame (methane or natural gas) for 10 seconds, and the flame is withdrawn. If the flame is extinguished within 24 seconds, the sample is reignited for 10 seconds and the flame again withdrawn. The flame extinguishment time is again recorded. If the flame extinguishment time does not exceed 5 seconds for either flame application, the sample is rated V-0; if the flame extinguishment time for either the first or second flame application is between 5–25 seconds, the sample is rated V-1. If a sample shows extinguishment times exceeding 25 seconds for either flame application, it is rated free-burning (FB) and is considered to have failed according to the test. Results are shown in Table I.

Table I

| % TCEPO | Flammability Rating* |
|---|---|
| None | FB; FB |
| 6% | FB; FB |
| 8% | V-1; V-1 |

EXAMPLE 5

The procedure of Example 4 is repeated except a blend of 70 parts polyphenylene oxide and 30 parts rubber-modified polystyrene was used. The results of both the UL-94 test and an oxygen index test are shown in Table II.

Table II

| Sample | Burning Times Seconds | Flammability Rating | Oxygen Index |
|---|---|---|---|
| Control | | FB | 18.7 |
| 2% TCEPO | | FB | 19.8 |
| 4% TCEPO | 9,25 | V-1 | 21.3 |
| 6% TCEPO | 3,25 | V-1 | 23.2 |
| 8% TCEPO | 10,0 | V-1 | 23.9 |

EXAMPLE 6

The procedure of Example 5 is repeated except that the material was processed at 280° C. and only the oxygen index of each sample determined. The results are:

| Sample | Oxygen Index |
|---|---|
| Control | 18.5 |
| 2% TCEPO | 20.1 |
| 4% TCEPO | 20.7 |
| 6% TCEPO | 22.3 |
| 8% TCEPO | 22.8 |
| 10% TCEPO | 23.2 |

EXAMPLE 7

The procedure of Example 4 is repeated except that benzyl bis(2-cyanoethyl)phosphine oxide (BBCEPO) is used in place of the tris(2-cyanoethyl)phosphine oxide. The results of both the Ul-94 and oxygen index tests are given in Table III below.

Table III

| Sample | Burning Time, seconds | Flammability Rating | Oxygen Index |
|---|---|---|---|
| Control | — | FB | 18.7 |
| 4% BBDEPO | 25,— | FB | 22.8 |
| 6% BBDEPO | 10,15 | V-1 | 25.7 |
| 8% BBDEPO | 3,3 | V-0 | 26.3 |

EXAMPLE 8

Following the procedure of Example 4, 6% by weight of the following compounds were determined to provide self-extinguishing polymer compositions, i.e. either V-0 or V-1:

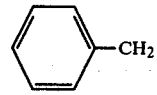

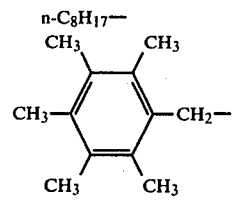

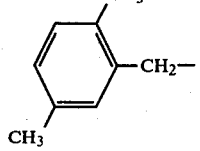

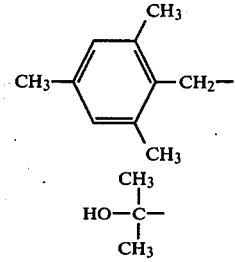

COMPARATIVE EXAMPLE

Following the procedure of Example 4, a determination was made of the flammability rating of a high impact polystyrene containing 20% by weight of TCEPO. When determined according to the UL-94 test procedure, the specimens were free-burning (FB).

The above examples illustrate that (1) for a 70/30 blend of polyphenylene oxide TCEPO has a critical concentration of about 4% by weight in order to provide self-extinguishing properties; (2) for a 50/50 blend about 6% by weight is needed of each flame retardant; and (3) TCEPO is not a flame retardant, even at a concentration as high as 20%, for high impact polystyrene.

What is claimed is:

1. A flame retardant composition comprising a homogeneous blend of polymers containing about 10 to 90 parts by weight polyphenylene ether resin, about 90 to 10 parts by weight polystyrene, and a flame retarding effective amount of a compound represented by the formula:

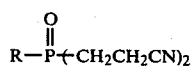

wherein R is alkyl of about 1 to 12 carbon atoms, hydroxyalkyl wherein the alkyl portion contains about 1 to 8 carbon atoms, benzyl, alkylbenzyl wherein the benzyl ring contains at least two alkyl groups each containing about 1 to 4 carbon atoms, and ω-cyanoalkyl wherein the alkyl portion contains about 1 to 4 carbon atoms.

2. The composition of claim 1 wherein the blend contains about 50 to 80 parts polyphenylene ether resin and 50 to 20 parts polystyrene.

3. The composition of claim 1 wherein the flame retardant compound is tris(2-cyanoethyl)phosphine oxide.

4. The composition of claim 3 wherein the blend is about 70 parts polyphenylene ether and about 30 parts polystyrene, and the phosphine oxide is incorporated in an amount of at least 4% by weight based upon the blend of polymers.

5. The composition of claim 3 wherein the blend is about 50 parts polyphenylene ether and about 50 parts polystyrene, and the phosphine oxide is incorporated in an amount of at least 6% by weight based upon blend of polymers.

6. The composition of claim 1 wherein the flame retardant compound is 2,4,6-trimethylbenzylbis(2-cyanoethyl) phosphine oxide.

7. The composition of claim 6 wherein the phosphine oxide is incorporated in an amount of at least about 6% by weight based upon the blend of polymers.

8. The composition of claim 1 wherein the phosphine oxide is incorporated in an amount of at least about 6% by weight based upon the blend of polymers.

9. The composition of claim 1 wherein the phosphine oxide is incorporated in an amount of about 8 to 10% by weight based upon the blend of polymers.

10. The composition of claim 1 wherein R is selected from benzyl; pentamethylbenzyl; 2,5-dimethylbenzyl; n-octyl; and 1,1-dimethylhydroxymethyl.

* * * * *